UNITED STATES PATENT OFFICE.

PAUL MARCELIN, OF NEW YORK, N. Y., ASSIGNOR TO HIMSELF, FRANKLIN OSGOOD, AND ROBERT WARREN, OF SAME PLACE.

IMPROVEMENT IN BLEACHING AND DISINFECTING.

Specification forming part of Letters Patent No. 125,469, dated April 9, 1872.

SPECIFICATION.

*Know all men by these presents:*

That I, PAUL MARCELIN, of the city, county, and State of New York, have invented a new and Improved Mode of Using Sulphurous Acid for Bleaching and Disinfecting; and I do hereby declare the following to be an exact description of the said mode or process of using sulphurous acid, for the purposes as aforesaid, so that others skilled in the arts may conduct the same with the same readiness and ease as I myself.

It is known that it is common now to use the fumes of burning sulphur, gaseous sulphurous acid being generated in the process, in the bleaching of straw, hops, and other goods, cloths, or materials; but this mode involves tedious manipulation, much waste, and frequently the creation of gases or acids injurious to the goods or articles to be bleached; at the same time there is no accuracy in the measurement of the amount or strength of acid eliminated, the furnaces may become clogged, the process cannot be continuous, and is necessarily uncleanly. Again, there are various substances which cannot be treated by the gaseous acid eliminated from the burning of sulphur, and heretofore no acid of sufficient strength to act upon their coloring-matter has been placed on the public market.

Hence, having by a process described in Letters Patent heretofore granted to me, P. MARCELIN, produced an acid of strength and purity which can be so used not only for all substances previously bleached by gaseous sulphurous acid, but for many others in the bleaching of which it has never been employed, and in fact all substances or materials of a dry or wet nature requiring to be bleached, or from which it is desired to extract coloring-matter, therefore, I herein proclaim the discovery of a new mode of using this acid in a gaseous state, and of a mode of using it in liquid solution, which could not heretofore be done.

When I use this sulphurous-acid gas in its gaseous state I take a quantity of the solution of a greater or less strength, as may be desired. The goods, straw, or other material having been hung in a room as is usual, I place the solution in a pan or pans, or other vessel, in the bottom or floor of the said room in which the goods have been hung or laid. This pan, tank, or other vessel is provided with steam-pipes or other heating apparatus. When all is arranged, the heat is let on and the sulphurous fumes are eliminated. This process is made continuous by drawing off the resultant water and letting in more of the sulphurine or sulphurous acid in solution. In other words, I provide a room arranged with shelves, or hooks, or slats, upon which straw, wool, cloth, or other material may be laid or hung. The bottom of this room I form into a tank, or series of tanks or tubs, with pipes or steam heat, or means of providing other heat. The shelves, hooks, or slats are covered or hung with the material to be bleached or disinfected, and the tank, tanks, or tubs are filled by a cock or cocks, or otherwise, with the sulphurous acid in solution, of any greater or less strength, as may be desired. A low degree of heat is then applied, as may be the temperature or the strength of the solution. This operation is made continuous until the substances to be bleached are of the proper whiteness, or, if clothing, or other matter to be disinfected, until, in the judgment of the operator, the process be perfect. The heat must not be so great as to generate steam. Again, in ships or buildings, or other like character of matter to be disinfected, the sulphurine or sulphurous acid in solution is placed in very strong solution in vessels of any name or character; if in ordinary weather, the heat of the atmosphere will eliminate the gas and effect an entire and complete disinfection of the air in the house, ship, or other matter, and destroy all spores or contagion; but in very cold weather it may be necessary to apply heat or to warm up the apartment, so as to cause the elimination of the sulphurous gas; or, by preference, the sulphurous solution may be sprinkled or thrown about the room, or ship, or other apartment, or yard, and as the fumes pass off by evaporation the disinfection or cleansing will be effected. When to be used in solution, I take the same of the desired strength, whether it be five, ten, or more degrees Baumé, and bathe, rinse, or agitate the cloths, straw, paper-stock, or other material therein, until the desired whiteness is obtained, using any vessel or engine which may be thought best. I use the sulphurine alone or in combination with other substances, as may be preferred, sometimes using the alkaline manganates or permanganates, and sometimes other chemicals. In this process, if heat be applied to hasten or perfect the operation, it must not be so great as to generate steam, as thereby sulphuric acid might be formed.

What I claim, and desire to secure by Letters Patent, is—

The use of sulphurous-acid solution as a bleaching and disinfecting agent, substantially as herein described.

Signed this 8th day of March, A. D. 1872.

P. MARCELIN.

Witnesses:
H. E. COLTON,
ROBT. REID.